Oct. 25, 1966 — E. D. GORDON — 3,280,960
CONVEYER UNLOADING
Filed Dec. 9, 1963 — 2 Sheets-Sheet 1

Elwood D. Gordon
INVENTOR.

BY
Ramsey, Kolisch & Hartwell
Attys.

Elwood D. Gordon
INVENTOR.

3,280,960
CONVEYER UNLOADING
Elwood Dale Gordon, Portland, Oreg., assignor to E. V. Prentice Co., Portland, Oreg., a partnership
Filed Dec. 9, 1963, Ser. No. 329,055
9 Claims. (Cl. 198—32)

This invention relates to apparatus for unloading a conveyer, and more particularly to unloading apparatus that is operable to remove sheets from a conveyer and deposit these sheets at another station, with the sheets arranged in an orderly fashion at said other station. The invention has particular utility in connection with the unloading of sheets from apparatus having multiple conveyer decks, where each deck in the apparatus transports sheets, since the mechanism may be employed to remove sheets from different decks in sequence, and transport these sheets to a station receiving sheets from all the decks, such as a stack, or another conveyer.

The invention is described hereinbelow in connection with the unloading of a veneer dryer, which is typically may include plural conveyer decks stacked one over another. In this organization, the unloading apparatus functions to take the sheets as they leave the various dryer decks, and place these sheets on a common "dry chain" or offbearing conveyer, where the sheets may be further processed. While the invention is described, and may be particularly applicable to the handling of veneer, it should be obvious that certain features of the invention may apply to other sheet handling operations, where similar problems exist.

A general object of the invention is to provide improved mechanism for unloading a conveyer, which is characterized by a relatively simple, practical construction, whereby the mechanism is relatively trouble-free in operation, the mechanism nevertheless performing the unloading function in an entirely satisfactory and practical manner.

Another object is to provide improved unloading apparatus, which is considerably more compact than most prior known types of constructions, and which, therefore, permits through its use substantial space savings in the usual mill.

A further object is to provide unloading apparatus which is relatively rapid in its operation, whereby the same may be successfully used to unload sheets from a relatively large number of decks, with such sheets being delivered to a receiving station which is common for all the sheets.

Another object is to provide an improved method for handling sheets and unloading them from a conveyor.

The usual veneer dryer has considerable length, and comprises plural conveyer decks stacked one over another, each of which is operable to transport sheets of veneer slowly through the dryer as the sheets are heated to remove moisture therefrom. Each deck carries successive charges, or groups, of sheets, and each charge of sheets ordinarily comprises plural sheets extending lengthwise in the dryer and disposed in a row extending transversely of the dryer deck. The feed of sheets into the decks of the dryer is staggered, in that first one and then another deck is fed a charge of sheets, with typically four or more decks being supplied a charge before the cycle is repeated, and the deck first fed a charge is supplied with another charge. On each dryer deck, the sheets of a charge have a uniform length and their ends aligned. Preferably successive charges on a deck follow each other as closely as possible, since this results in maximum dryer capacity.

Sheets travel to adjacent the offbearing end of the dryer in substantially the same order that they are fed into the dryer. Thus, successive charges of sheets arrive at the offbearing ends of the different decks, at different times, and the sheets in the various charges occupy approximately aligned positions. The function that the unloading apparatus of the invention performs, in conjunction with such a dryer, is to remove the successive charges of sheets as they leave the dryer, and to deposit these charges on the offbearing conveyer, with the sheets disposed while still essentially in alignment and without overlapping of edges, etc. The sheets may then be easily sorted, or have other operations performed thereon.

On moving through a dryer, veneer sheets are clamped positively, by rolls engaging top and bottom faces of the sheets. This keeps the sheets flat, and helps maintain the sheets in a charge in alignment. Some misaligning of the sheets does occur in the dryer, and further, all sheets in a charge never have exactly the same length, so if one set of ends are aligned, there will be some misalignment in the ends opposite. This, and the fact that the sheets are clamped while in the dryer, produces problems in unloading the dryer deck.

Further explaining, when a charge of sheets is to be removed from one of several decks in a dryer, its speed must be increased from the speed of the charge through the dryer, in order that there be time for the charge to be loaded completely at the station receiving the charge before the next charge of sheets is due to arrive at said station. To illustrate, let it be assumed that there are five decks in the dryer. With such a dryer, five different charges of sheets must be deposited at the station receiving the sheets, in the time that it takes a charge on any one deck in the dryer to move its full length. Because of the speed-up in the movement which must be imparted to each charge, a tendency to accentuate any misalignment in the trailing ends of the sheets in the charge is introduced. Thus, let it be assumed that there are two sheets in a charge, and the trailing end of one is two inches ahead of the trailing end of the other. If these sheets are moved forwardly immediately upon leaving a pair of opposed clamping rolls in the dryer, at a speed which is five times dryer speed, then the sheet with the trailing end two inches ahead of the other will travel ten inches at an accelerated speed after leaving the dryer, before the next sheet starts to move at the same speed.

According to this invention, sheets adjacent the offbearing end of a dryer travel onto a reach of a conveyer which defines an extraction zone in the apparatus. In this zone, as in other parts of the dryer, the sheets are clamped in place, by means that clamps the sheets onto the conveyer defining the extraction zone, whereby the orderly arrangement that they had in the dryer is maintained. On traveling into the extraction zone, the speed of the sheets in a charge is the same as the speed that they had in traveling through the dryer. On the sheets in a charge traveling completely into the extraction zone, two operations are performed in rapid succession. First, the clamping pressure exerted on the sheets in the extraction zone is removed, so that the sheets instead of being positively clamped in place become frictionally supported only by the reach of the conveyer defining the extraction zone. After removal of the clamping pressure, a high velocity transporting agency is placed in "operative" condition, which attaches to all the sheets in a charge simultaneously, at a point located between the ends of the sheets. This agency imparts to all of the sheets in a charge, simultaneously, an accelerated forward motion, with all of the sheets then moving rapidly forwardly, without any misalignment occurring therein.

Thus, a more specific object of the invention is to provide unloading apparatus for a sheet-handling conveyer, that features a high-velocity transporting agency, in an organization wherein such agency is placed in operative condition, whereby it moves all sheets at a faster speed than conveyer speed, only after all sheets in a charge are in a position to be acted upon simultaneously by the agency.

Another object is to provide, in unloading apparatus for a sheet-handling conveyer, conveyer means defining an extraction zone, clamping means cooperating with said conveyer means and adjustable between clamping and release positions so as either to hold sheets positively in the extraction zone or to free the sheets, and a high-velocity transporting agency adjustable to an operative condition which functions to transport all sheets in a charge, simultaneously, at a high velocity, upon release of sheets by said clamping means.

A further object is to provide an unloader, which comprises a supporting conveyer section for supporting sheets, a clamping conveyer section superimposed over said supporting conveyer section for either clamping sheets on the supporting conveyer or releasing such sheets, and pinch-roll mechanism adjacent the off-bearing end of the supporting conveyer section, said pinch-roll mechanism and clamping conveyer section being operatively interconnected whereby on release of sheets by the clamping conveyer section the pinch-roll mechanism is then effective to move sheets forwardly at a rapid speed.

A still further object is to provide novel unloading mechanism, for apparatus including multiple-conveyer decks, such as dryer decks in a dryer, which includes means for each deck for grabbing all sheets in a charge after they leave the dryer, simultaneously, and moving the sheets forwardly without producing misalignment therein, said means for all the decks producing proper sequential unloading of the various decks.

A still further object is to provide novel control means for dryer-unloading apparatus which features sequencing means controlled by sheets moving on one deck.

These and other objects and advantages are attained by the invention, which is described more specifically hereinbelow in conjunction with the accompanying drawings, wherein.

Figure 1:
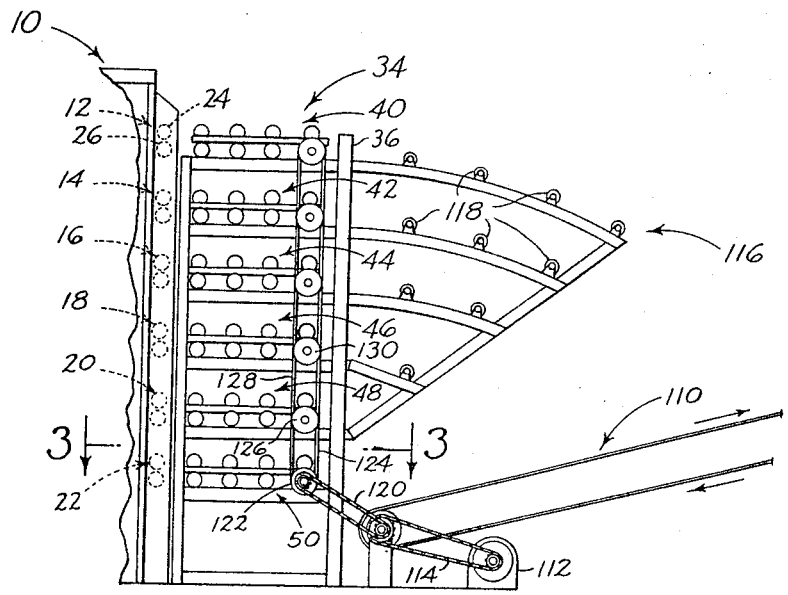
FIG. 1 is a side view, somewhat simplified, of the off-bearing end of a dryer and unloading apparatus provided adjacent such offbearing end for removing sheets therefrom.

Referring now to the drawings, and more particularly to FIG. 1, 10 indicates generally the offbearing end of a dryer, such as may be used in the drying of veneer preparatory to making plywood therefrom. The dryer in the embodiment shown has six dryer or conveyer decks, indicated at 12, 14, 16, 18, 20, and 22, respectively. Each deck in the dryer is defined by plural pairs of opposed clamping rolls, such as the ones shown at 24, 26 for deck 12, extending transversely of the dryer, these pairs of rolls being disposed in a row extending along the length of the dryer. The rolls may be smooth-surfaced, steel rolls, and veneer sheets, on traveling through the dryer, travel between the bites of the various rolls, with clamping pressure being applied to the sheets.

The bottom rolls of each deck are driven as by a dryer chain, such as chain 28 shown for deck 22 (see FIGS. 3 and 4), and a motor (not shown) operatively connected to the dryer chain. The bottom rolls of each deck drive the top rolls of the deck, through star gears that interconnect the rolls, such as star gears 30, 32.

The entire dryer is not illustrated in the drawing, as such are well-known to those familiar with the art.

Typically the dryer is a relatively long piece of equipment, which makes it advantageous to employ apparatus which is as compact as possible for unloading veneer sheets from the dryer at the offbearing end thereof.

The apparatus provided for unloading the decks of the dryer is shown directly adjacent the offbearing end of the dryer and is indicated generally at 34. In the embodiment illustrated, apparatus 34 includes a separate frame 36 which is mounted on the floor adjacent the dryer. This facilitates entry into the dryer for such purposes as repair, since the unloading apparatus may be easily shifted away from the end of the dryer. If desired, however, the frame of the apparatus may be integral with the dryer frame, as the apparatus in some embodiments may be thought of as an integral part of the dryer.

Unloading apparatus 34 is provided with six decks, indicated at 40, 42, 44, 46, 48, and 50, which constitute extensions of the six dryer decks.

Figure 3:
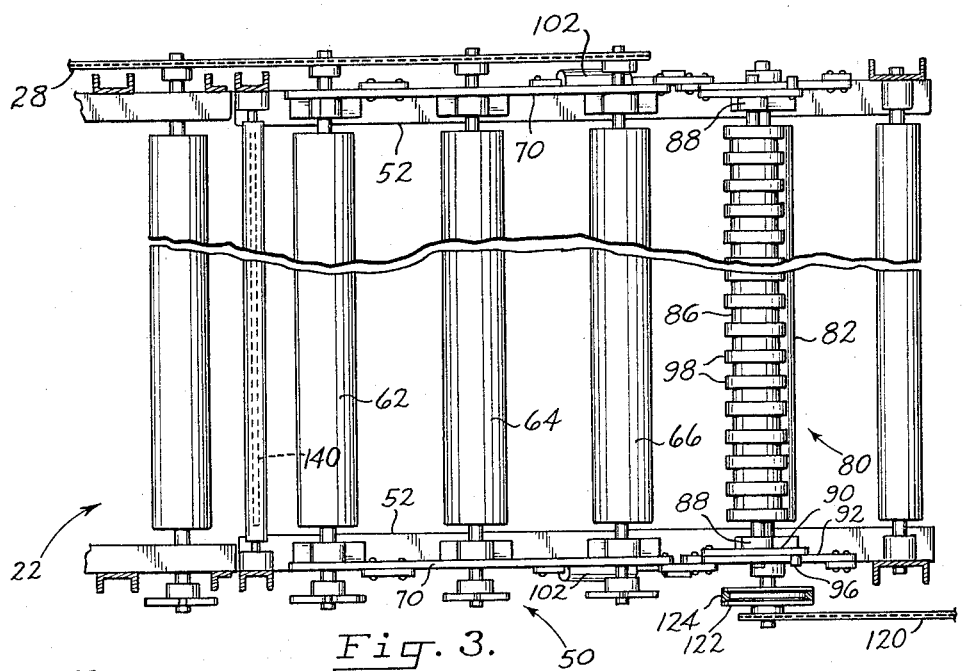
FIG. 3 is a view taken along the line 3—3 in FIG. 1, and on an enlarged scale, showing in further detail the means for unloading one of the decks.
Figure 4:
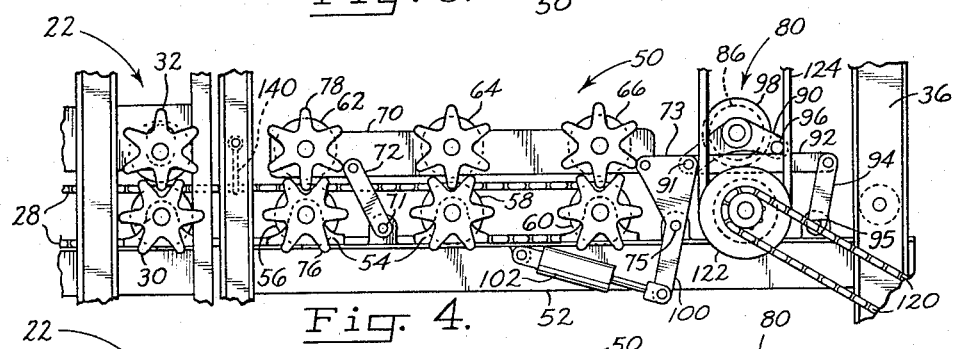
FIG. 4 is a side elevation of the apparatus illustrated in FIG. 3, showing the apparatus in one position.
Figure 5:
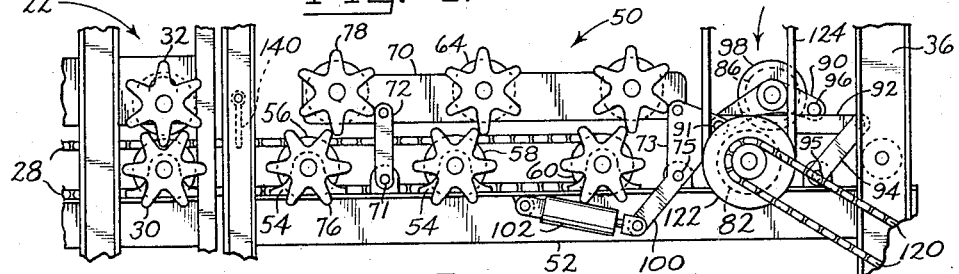
FIG. 5 is a view similar to FIG. 4, but showing the apparatus in another position.

Referring now to FIGS. 3, 4, and 5, and describing with more particularity the construction of deck 50 in apparatus 34 (the decks are similar in construction and thus only one is described in detail), beams 52 are provided for each deck, with one on each side of the apparatus, these beams being part of frame 36. Journaled on opposed beams 52, by means of bearings, such as bearings 54, are transversely extending, smooth-surfaced rolls 56, 58, and 60. These rolls constitute a bottom or supporting conveyor section, and also constitute a reach of a conveyor defining what is referred to herein as an extraction zone in the apparatus.

Superimposed over rolls 56, 58, and 60 are smooth-surfaced rolls 62, 64, and 66. These have opposite ends journaled in a pair of bars 70 extending along either side of the apparatus above beams 52. Each bar 70 has links 72, 73 pivotally connected to it, and these links in turn are pivotally connected to the beam 52 below the bar, by pivots 71, 75. Rolls 62, 64, and 66, and the bars mounting the ends of these rolls, constitute a clamping conveyer section superimposed over the supporting conveyer section in the apparatus.

Rolls 56, 58, and 60 of the supporting conveyer section are driven by dryer chain 28, and thus these rolls rotate at the same speed as the rolls in the dryer. Rotation is transmitted from rolls 56, 58, and 60 to rolls 62, 64, and 66 through star gears, such as star gears 76, 78.

Adjacent the offbearing end of each deck in unloading apparatus 34 is a high-velocity transporting agency, more specifically a pinch-roll mechanism, indicated for deck 50 generally at 80. Pinch-roll mechanism 80 (and similarly the other roll mechanisms) is adjustable between an inoperative position, where sheets may pass between the rolls of the roll mechanism without their travel affected thereby, and an operative position, where the rolls of the roll mechanism are together and contact opposite faces of sheets as they pass between the bite of the rolls, thus to impart to the sheets a velocity determined by the speed at which the rolls therein are rotated.

Describing more specifically a pinch-roll mechanism, and considering pinch-roll mechanism 80, each comprises a bottom or supporting roll 82 journaled on beam 52. Superimposed over the bottom roll is an upper clamping roll 86. Each end of the clamping roll is journaled in a bearing, such as bearing 88, and each of these bearings in turn is mounted on a pivoted member 90. Each member 90 is pivoted to a link 73 at 91.

As can best be seen in FIGS. 4 and 5, extending to the right of link 73 is a bar 92. One end of bar 92 is also pivoted to link 73 by pivot means 91. The other end of bar 92 is pivotally connected to a link 94 which has its bottom end pivoted to beam 52 at 95. Member 90 has a roller 96 journaled thereon which extends over and is supported by bar 92.

From this it will be seen that clamping roll 86 is pivotally supported at each end by pivot means 91. Gravity urges the roll downwardly to a position where roller 96 mounted on member 90 supporting each end of the roll contacts the bar 92 beneath the roller. By pivotal movement of links 73, 94, from the position shown in FIG. 4 to the position shown in FIG. 5, bar 92 at each end of clamping roll 86 is lowered, which means that such movement also has the effect of lowering roll 86.

Clamping roll 86 includes annular gripping members 98 about the perimeter thereof, of rubber or other elastomer material, which with roll 86 lowered, as in FIG. 5, contact roll 82. When a sheet passes between roll 86 and roll 82 with roll 86 lowered, members 98 resiliently press against the top of the sheet, while the weight of roll 86 clamps the bottom face of the sheet against roll 82.

Joined to link 72 on each side of the apparatus is a depending arm 100. Arm 100 comprises an actuating arm, and is employed to pivot the link to which it is attached, about pivot 75. Pivotal movement of an arm 100 is produced by a ram or power-operated means 102, pivotally connected at its cylinder end to a beam 52, and pivotally connected at its rod end to the lower end of arm 100.

As can be seen in FIG. 4, with rams 102 extended, links 73 on either side of the apparatus occupy substantially upright positions. With rams 102 contracted, as shown in FIG. 5, links 73 are pivoted in a clockwise direction from this substantially upright position.

The clamping conveyer section, comprising rolls 62, 64, 66, and bars 70 in which these rolls are mounted, occupies a clamping position in FIG. 4, and in this position the bottoms of the rolls operate to urge sheets of veneer thereunder into contact with rolls 56, 58, and 60, below the clamping conveyer section. Pinch-roll mechanism 80 occupies an inoperative position in FIG. 4, and in this position roll 86 is supported some distance above roll 82, so that with any veneer sheets between the two rolls, no clamping pressure is applied thereto.

Upon contraction of rams 102 on either side of the apparatus, and shifting of the parts to the positions shown in FIG. 5, the clamping conveyer section is raised and placed in a release position. In this position, sheets traveling over the supporting conveyer section are supported only, and do not have clamping pressure applied thereto. That is to say, in this release position, rolls 62, 64, and 66 are spaced some distance above any veneer sheets on the supporting conveyer section and out of contact therewith. Contraction of rams 102 also functions to adjust pinch-roll mechanism 80 to an operative position, where sheets passing over roll 82 are pinched between this roll and roll 86.

Referring again to FIG. 1, an offbearing conveyer is indicated at 110. The unloading mechanism described is operable to take sheets from the decks of the dryer, and to deposit all of these sheets on this offbearing conveyer. Conveyer 110 may be driven by a motor 112, connected to the conveyer through a chain 114.

Sheets may travel directly from deck 50 of the unloading apparatus onto conveyor 110. The same is true for sheets traveling out of the dryer and onto deck 48 of the unloading apparatus. In order that sheets traveling from the decks of the unloading apparatus above deck 48 may be lowered gradually onto conveyer 110, roll structure 116 is provided, which has rolls 118 that define paths of travel extending from the various decks and curving downwardly toward conveyer 110 beneath.

As already indicated, the rolls in the bottom or supporting conveyer sections of the various decks in the unloader are driven at the same speed as the rolls in the dryer. The pinch-roll mechanism for each deck in the unloading apparatus, however, is driven at a substantially faster speed, whereby when the pinch-roll mechanism is placed in its operative position, so as to clamp onto a charge of sheets, such sheets are then moved forwardly at a speed which is substantially faster than the speed of the sheets through the dryer.

In the embodiment of the invention illustrated, and referring again to FIG. 1, drive for the various pinch-roll mechanisms is supplied by a chain 120, which is driven by motor 112. Chain 120 turns a pulley 122 (see FIGS. 3, 4, and 5) connected to roll 82 of pinch-roll mechanism 80, whereby the pulley rotates the roll. Belt 124 connects pulley 122 with a pulley 126 (see FIG. 1), which drives the pinch-roll mechanism for deck 48 corresponding to pinch-roll mechanism 80 for deck 50. A belt 128 similarly connects pulley 126 with a pulley 130, which drives the pinch roll mechanism for deck 46. Similar belts and pulleys interconnect the remaining pinch-roll mechanisms of the other decks, so they are all driven conjointly by motor 112.

Explaining now how the apparatus described operates, let it be assumed that a charge containing plural sheets of veneer, with such sheets in substantial alignment, begins to emerge from the offbearing end of dryer deck 22 which feeds deck 50 of the unloading apparatus. With this charge of sheets emerging from the dryer, the clamping conveyer section is placed in its clamping position, and pinch-roll mechanism 80 is placed in its inoperative position, which is the condition of the parts shown in FIG. 4. As a result, veneer sheets travel out onto the deck of the unloading apparatus, while still clamped between bottom and top rolls. The speed of the sheets in the charge is still the same as the speed of the sheets traveling through the dryer.

After the charge of sheets has completely left the dryer, so that the trailing ends of the sheets in the charge are approximately at the location of rolls 56 and 62, the lead ends of the sheets in the charge ordinarily will be substantially out in front of pinch-roll mechanism 80. At this time, rams 102 controlling links 73 on either side of the apparatus are contracted, causing the clamping conveyer section, comprising rolls 62, 64, and 66, to be raised, so as to place it in its release position, and pinch-roll mechanism 80 to be shifted to its operative position, where the rolls thereof are moved together to produce pinch pressure on the portions of the sheets disposed between the rolls of the mechanism. The result of such an adjustment in the clamping conveyer section and pinch-roll mechanism is first to remove clamping pressure simultaneously from all sheets, and then to apply to all sheets in the charge simultaneously, a force moving the sheets forwardly which is a function of the pinch-roll mechanism. Since all sheets are pinched substantially simultaneously, and are freed from the clamping conveyer section simultaneously, all are then moved forwardly at the same speed (which is a faster speed than they had before), with no substantial change occurring in the alignment of the sheets in the charge. On finally leaving the pinch-roll mechanism, the sheets are ejected onto conveyer 110, with the sheets on the conveyer having substantially the same relative position that they had while traveling as a charge through the dryer.

All the other decks in the unloading apparatus operate in a similar manner. In each deck, the sheets are moved forwardly at a faster speed, only after they have been freed of clamping pressure exerted by a clamping conveyer section, and only by the employment of pinch pressure applied simultaneously to all the sheets in a charge.

As already indicated, different charges of sheets are fed into the dryer with feed first being to one deck, and then another, so that the charges in the various dryer decks are staggered. On leaving the dryer, the unloading apparatus functions to take the various charges as they emerge from the dryer and deposit these on the conveyer. To do this, therefore, the various decks of the unloading apparatus are operated sequentially, with the sequence of operation corresponding to the order with which charges are fed into the dryer.

It will be seen that a novel method of handling sheets is contemplated, where the sheets are disposed in successive groups on a conveyer, i.e., a dryer deck, with each group containing plural sheets. The sheets are moved on this conveyer or through the dryer without changing their relative position. With all the sheets moving at the speed of the conveyer, and in the extraction zone defined thereby, clamping pressure on all the sheets in a group is released, whereupon the sheets are moved only through frictional contact with their bottom faces. After release of such clamping pressure, the high-velocity transporting agency, or pinch-roll mechanism, produces positive attachment with the sheet through gripping bottom and top faces of the sheets. Since all sheets are attached simultaneously, their relative position is maintained, while their speed is increased.

Figure 2:
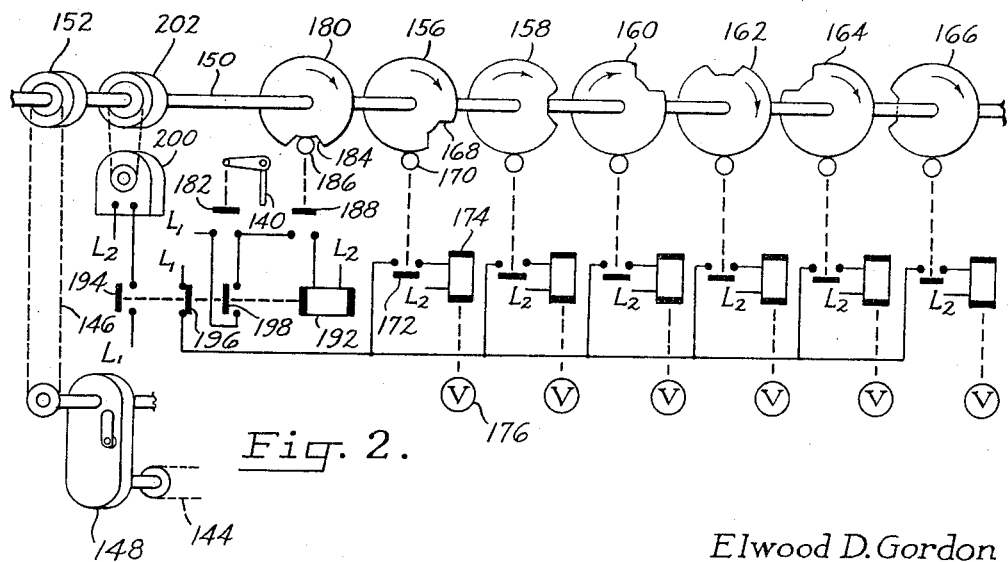
FIG. 2 is a schematic view illustrating portions of control apparatus employed to produce proper sequential unloading of the various decks in the dryer.

A control means contemplated for the apparatus is illustrated in FIG. 2. This control means controls actuation of rams 102, whereby they are actuated in proper sequence to produce automatically unloading of charges on the various decks.

As can be seen in FIGS. 3, 4, and 5, a gate 140 is provided above bottom deck 50, which is pivotally supported on the frame of the apparatus. The gate is positioned so as to be contacted by sheets traveling onto the bottom deck. On the gate being contacted by the leading ends of sheets in a charge, the gate is swung to the right in FIGS. 4 and 5, which functions to actuate a switch. This switch controls sequencing mechanism, to be explained.

More specifically, and referring to FIG. 2, 144 indicates a chain which is driven by the means driving chain 28 of the dryer deck. Thus, the chain moves at a speed related to the speed at which the dryer deck operates. Chain 144 drives a chain 146 through an adjustable speed reducer 148. Chain 146, in turn, rotates a shaft 150 (shown in perspective in FIG. 2 to enable better illustration of cam elements secured thereto), through an over-running clutch 152.

When handling a given length of veneer, the speed reducer is adjusted so that shaft 150 undergoes one complete revolution, during the time that it takes for a charge of sheets to move into and then completely past gate 140.

Shaft 150 has a series of cams secured thereto, indicated at 156, 158, 160, 162, 164, and 166. One is provided for each deck in the unloading apparatus, and controls the actuation of the rams that perform the unloading for the deck, as already described.

Each cam has a notch, such as notch 168 shown for cam 156, provided in the periphery thereof. A cam follower, such as cam follower 170, rides on the peripheral surface of each cam. When the cam follower drops into the notch, a switch is actuated, such as switch 172, producing energizing of a solenoid, such as solenoid 174, and adjustment of a valve, such as valve 176, gauged to the solenoid, which regulates the flow of pressure fluid to the rams 102 of a deck in the unloader.

With follower 170 in notch 168, switch 172 is closed, solenoid 174 is energized, and valve 176 is in a position producing contraction of rams 102. With the follower 170 outside of notch 168, switch 172 is open, solenoid 176 is deenergized, and valve 176 is in a position producing extension of rams 102. Thus, with the follower in the notch, the clamping conveyor section of a deck is in its release position and the pinch-roll mechanism of the deck is in its operative position, and with the follower out of the notch, the clamping conveyer section is in its clamping position and the pinch-roll mechanism is in the inoperative position.

It will be noted that the notches of the various cams are angularly spaced from each other, about the axis of shaft 150. It is this that results in the followers dropping into appropriate notches successively, whereby unloading of the decks is done according to a prescribed sequence.

Shaft 150 also has a cam 180 secured thereto, which is a reset cam. The reset cam operates to insure that shaft 150 is at a starting position for the shaft each time that a new charge of sheets travels onto deck 50 of the unloader and into gate 140. With the shaft not in its starting position the reset cam causes a reset motor 200 to be actuated, which operates quickly to rotate the shaft until it reaches its proper starting position.

More specifically, and referring to FIG. 2, gate 140 is ganged to a switch 182. When the gate is contacted by the lead ends of the sheets in a charge moving onto deck 50 of the unloading apparatus, switch 182 closes. If the sequencing mechanism at this time is set properly, upon switch 182 closing (i.e. each time a new charge of sheets moves onto deck 50), a notch 184 provided in cam 180 is in a position where it receives a follower 186, and a switch 188 ganged to follower 186 is open. Switches 182, 188, and a solenoid 192 are connected in series between source conductors $L_1$, $L_2$. Thus, with the condition described, the circuit to solenoid 192 remains open on closing of switch 182, a switch 194 ganged to solenoid 192 remains open, and reset motor 200 (which is controlled by switch 194) remains with the supply circuit therefor open, and thus deactivated.

In the event that the length of sheets in the charges is such that after one unloading of deck 50, and when the next charge of sheets moves onto deck 50, follower 186 is not within notch 184 of the reset cam, then upon gate 140 closing switch 182, switch 188 will also be closed. With this condition of the parts, on closing of switch 182, solenoid 192 is energized, and switch 194 closes. Further, a switch 196 opens, and another switch 198 also closes. Switch 196 by opening prevents the energizing of solenoid 174 and the other solenoids corresponding to it. Switch 198 is a holding switch operable to hold solenoid 192 energized.

With switch 194 closed, the supply circuit for motor 200 is closed. Motor 200 is connected to shaft 150 through an over-running clutch 202. On the supply circuit for motor 200 becoming closed, the motor is actuated and rotates shaft 150 to place cam 180 so that its notch receives cam follower 186. When this condition occurs, switch 188 opens, solenoid 192 deenergizes, and further movement of the shaft by the motor is stopped. The reset cam then has placed the shaft in its starting position.

Thus it will be seen that a relatively simple control mechanism produces unloadings in proper sequence, with such determined by the flow of veneer sheets across deck 50. The adjustable speed reducer is adjusted to produce approximately the desired rotation speed in shaft 50. Motor 200 need only operate when timing is thrown off because of small changes in veneer sheet lengths.

Summarizing the invention, it will be apparent that the apparatus provided for unloading the decks of the dryer is relatively compact. The apparatus in many cases need have a length which is only a fraction of the length of the usual sheets handled. There is no relative shifting in the sheets of a charge when their motion is increased, such as has characterized prior known unloaders.

While an embodiment of the invention has been described, it is appreciated that various changes may be made in the apparatus, without departing from the invention. It is desired to cover all modifications and variations that would be apparent to one skilled in the art, and that come within the scope of the appended claims.

What is claimed is:

1. A method of handling sheets traveling on a conveyer where the sheets are disposed in successive groups with each group containing a plural number of sheets extending in a row across the conveyer, the method comprising moving the sheets of a group over a portion of the conveyer at the speed of the conveyer and while exerting a clamping pressure on the sheets through their top and bottom faces thus positively to hold the sheets in a substantially unchanging relative position, with the sheets of a group moving at the speed of the conveyer releasing the clamping pressure of all the sheets in the group simultaneously, after release of clamping pressure positively attaching substantially simultaneously to all of the sheets in the group a high-velocity transporting agency, and after attachment with said high-velocity transporting agency, and while the sheets occupy the same relative position they had while positively held with clamping pressure on the conveyer, moving all of the sheets off the conveyer at a speed determined by the transporting agency, said high-velocity transporting agency being operated to produce a faster speed than the speed of the conveyer.

2. A method of handling sheets traveling on a conveyer where the sheets are disposed in successive groups with each group containing a plural number of sheets extending in a row across the conveyer, the method comprising moving the sheets of a group over a portion of the conveyer at the speed of the conveyer and while exerting a clamping pressure on the sheets through their top and bottom faces thus positively to hold the sheets in substantially the same relative position, with the sheets of a group moving at the speed of the conveyer and adjacent the offbearing end of the conveyer relaxing the clamping pressure exerted on all the sheets in the group simultaneously, thus to leave the sheets moving at conveyer speed without clamping pressure exerted thereon, after relaxing the clamping pressure positively attaching, simultaneously to all of the sheets in the group, a high-velocity transporting agency, with the sheets after said attachment having substantially the same relative position they had while moving on the conveyer with clamping pressure exerted thereon, and after attachment with the high-velocity transporting agency moving all of the sheets simultaneously off the conveyer at a speed determined by the transporting agency, said high-velocity transporting agency being operated to produce a faster speed than the speed of the conveyer.

3. In the handling of sheets on two adjacent conveyer decks, the method comprising moving the sheets on each conveyer deck with the sheets on each deck disposed in successive groups and with each group containing a plural number of sheets extending in a row across the deck, arranging the groups on one deck so that they are staggered with respect to the groups on the other deck, exerting a clamping pressure on the sheets of each group as it moves on each deck, through pressing on their top and bottom faces, thus positively to hold the sheets in each group in substantially an unchanging relative position, removing the sheets from the offbearing end of the two decks with removal of first one group from one deck and then one group from the other deck, and placing the sheets from the various groups in a common receiving zone, said removing of sheets being done through the steps of first relaxing the clamping pressure on all the sheets in a group simultaneously, when the group travels to adjacent the offbearing end of the deck, after relaxing the clamping pressure positively attaching simultaneously to all of the sheets in the group a high-velocity transporting agency, and after positively attaching to all of the sheets in a group with the transporting agency, and with the sheets in the group still having the same relative position they had while clamped in the deck, moving the sheets off the deck at a speed determined by the transporting agency, said high-velocity transporting agency being operated to produce a faster speed than the speed of the deck.

4. In sheet-handling apparatus, a power-driven conveyer operable to move sheets at a given speed, said conveyer including a reach where sheets are frictionally contacted over one set of faces only, an adjustable clamping section mounted beside said reach of the conveyer and adjustable between a position where the section engages the set of faces of sheets on said conveyer opposite their said one set of faces, and a position where said section is out of engagement with said opposite set of faces of the sheets, a high-velocity transporting means adjacent the offbearing end of said reach of the conveyer, said transporting means having an operative position where sheets are moved by the transporting means at a speed which is faster than the speed of the conveyer while contacted on opposite sets of faces and thus positively held by the transporting means, and an inoperative position where sheets travel through the transporting means without their travel affected thereby, and means for shifting said high-velocity transporting means between inoperative and operative positions.

5. In sheet-handling apparatus, a power-driven conveyer for moving sheets at a given speed, said conveyer including a reach having bottom and top sections operable to clamp onto opposite sets of faces of sheets traveling on the conveyer, and an offbearing reach supplied sheets by said first-mentioned reach having a bottom section for supporting the bottom set of faces of sheets, an adjustable clamping section mounted beside said offbearing reach of the conveyer adjustable toward and away from the latter's bottom section between a clamping position operable to produce clamping pressure on sheets and a release position where sheets are released from clamping pressure, pinch-roll mechanism including at least one power-driven roll adjacent the offbearing end of said offbearing reach of the conveyer, said pinch-roll mechanism being adjustable between positions where sheets traveling therethrough are pinched by the roll mechanism and a position where such sheets are released from pinch pressure by the mechanism, and power-operated means for driving said one power-driven roll at a speed which is faster than the speed of the conveyer.

6. In mechanism for unloading sheets from a conveyer, a power-driven bottom conveyer section for supporting the bottom faces of sheets leaving the conveyer, a clamping conveyer section mounted over said bottom conveyer section, said clamping conveyer section being adjustable toward and away from said bottom conveyer section between a clamping position operable to produce clamping pressure on sheets and a release position where such clamping pressure is released, pinch-roll mechanism positioned adjacent the offbearing end of said bottom conveyer section including at least one power-driven roll, said pinch-roll mechanism having an operative position operabe to pinch sheets traveling on the bottom conveyer section and an inoperative position where sheets traveling on the bottom conveyer section travel through the pinch-roll mechanism without pinch pressure applied thereto, power-operated means for driving said power-driven roll at a speed which is faster than the speed of the conveyer, and means for shifting said clamping conveyer section to its release position and said pinch-roll mechanism to its operative position, in that sequence.

7. For a multi-deck veneer sheet dryer, unloading mechanism for the decks of the dryer comprising
- a power-driven supporting conveyer section for each dryer deck adapted to support sheets leaving the dryer deck,
- a clamping conveyer section superimposed over the power-driven supporting conveyer sections of each deck,
- each of said clamping conveyer sections being mounted for movement between a clamping position where sheets passing over the supporting conveyer section thereunder are clamped thereon and a release position where such sheets are supported on the supporting conveyer section without clamping pressure applied,
- pinch-roll mechanism adjacent the offbearing end of each supporting conveyer section including a lower supporting roll and an upper clamping roll,
- each of said pinch-roll mechanisms being adjustable between an operative position where sheets on the supporting conveyer section are pinched between the rolls of the mechanism and an inoperative position where such sheets on the supporting conveyer section pass freely between the rolls of the mechanism without pinch pressure applied thereto,
- power-operated means connected to the clamping conveyer section and pinch-roll mechanism of each supporting conveyer section operable to place the clamping conveyer section to its clamping position and the pinch-roll mechanism to its inoperative position on sheets first traveling into the supporting conveyer section and operable to move the clamping conveyer section to its release position and the pinch-roll mechanism to its operative position, in that order, on further movement of the sheets on the supporting conveyer section, and
- control means for controlling the power-operated means of the various decks whereby the power-operated means are actuated sequentially.

8. The unloading mechanism of claim 7, wherein said control means produces sequential actuation of the power-operated means connected to the various clamping conveyer sections and pinch-roll mechanisms, with such actuation being in timed relation to the movement of veneer sheets over one of the supporting conveyer sections in the unloading mechanism.

9. The unloading mechanism of claim 8, wherein the control means comprises
- means detecting sheets entering said one supporting conveyer section,
- sequencing mechanism having a starting condition and operable in running of the mechanism from its said starting condition to produce sequential actuation of the various power-operated means, and
- means operable to reset said sequencing mechanism in its said starting condition each time sheets are detected entering said supporting conveyer section.

References Cited by the Examiner
UNITED STATES PATENTS

| | | | |
|---|---|---|---|
| 2,830,690 | 4/1958 | Macoy et al. | 198—134 X |
| 3,038,585 | 6/1962 | Beckley | 198—20 X |
| 3,087,597 | 4/1962 | Jeddeloh | 198—32 |
| 3,124,233 | 3/1964 | Jeddeloh | 198—76 X |
| 3,124,352 | 3/1964 | Weidenhammer | 198—167 X |
| 3,209,886 | 10/1965 | Yock | 198—20 |

EVON C. BLUNK, *Primary Examiner.*

R. J. HICKEY, *Assistant Examiner.*